United States Patent [19]

Narayan et al.

[11] Patent Number: 5,459,221
[45] Date of Patent: Oct. 17, 1995

[54] POLYISOCYANATE COMPOSITIONS FOR THE PREPARATION OF FLEXIBLE POLYURETHANE FOAMS

[75] Inventors: Thirumurti Narayan, Grosse Ile; David J. Lovell, Woodhaven, both of Mich.; Carlos H. Lopez, Edo de Mexico, Mexico

[73] Assignee: BASF Corporation, Mt. Olive, N.J.

[21] Appl. No.: 419,321

[22] Filed: Apr. 10, 1995

Related U.S. Application Data

[62] Division of Ser. No. 281,957, Jul. 28, 1994, Pat. No. 5,436,277.
[51] Int. Cl.$^6$ ............................. C08G 18/70; C08K 3/00
[52] U.S. Cl. ................... 528/67; 252/182.2; 252/182.22; 521/115; 521/129; 521/137; 521/159; 521/174; 528/59; 528/76; 560/26; 560/359
[58] Field of Search ................... 528/59, 67, 76; 252/182.2, 182.22; 560/26, 359

[56] References Cited

U.S. PATENT DOCUMENTS

| | | |
|---|---|---|
| 3,124,605 | 3/1964 | Wagner . |
| 3,492,251 | 1/1970 | Gemeinhardt . |
| 3,909,464 | 9/1975 | Anorga . |
| 4,256,849 | 3/1981 | Ick . |
| 4,801,644 | 1/1989 | Googan . |
| 4,803,229 | 2/1989 | Narayan . |
| 5,132,334 | 7/1992 | Gansen et al. . |

*Primary Examiner*—Morton Foelak
*Attorney, Agent, or Firm*—Mary E. Golota

[57] ABSTRACT

The invention provides a liquid polyisocyanate prepolymer composition which is a result of combining about 50 to 90 percent by weight of an isocyanate blend (a.) having 55 to 75 weight percent 4,4'-MDI, 17 to 27 weight percent 2,4'-MDI, 1 to 10 weight percent 3-ring MDI oligomer, and 1 to 15 weight percent n-ring MDI oligomer (n greater than 3); about 5 to 30 weight percent of a polyhydroxy containing polyol (b.) having a molecular weight of from 700 to about 6,000, and about 5 to 15 weight percent of a toluene diisocyanate (c.). The resulting isocyanate prepolymer composition has a free NCO content of from about 20 to 40 weight percent and particularly desirable flow characteristics. The invention further provides a method of making an isocyanate prepolymer composition, a process of making a polyurethane foam utilizing the isocyanate prepolymer composition of the invention, and polyurethane foams produced by the disclosed process.

8 Claims, No Drawings

POLYISOCYANATE COMPOSITIONS FOR THE PREPARATION OF FLEXIBLE POLYTURETHANE FOAMS

This is a division of application Ser. No. 08/281,957, filed Jul. 28, 1994, now U.S. Pat. No. 5,436,277.

BACKGROUND OF THE INVENTION

The invention provides an isocyanate prepolymer composition useful in the preparation of flexible polyurethane foams which are particularly suitable in seating applications. The invention further provides a method of preparing the isocyanate prepolymer composition, a method of using the composition in the manufacture of polyurethane foams and the resultant foams. More particularly, the invention relates to an isocyanate prepolymer composition which results from combining a particular isocyanate blend, a particular polyhydroxy-containing polyol and a toluene diisocyanate.

The reactions of polyisocyanates with compounds containing at least two isocyanate-reactive hydrogen atoms are well known. When conducted in the presence of a catalyst and blowing agent, such reactions are used to manufacture both rigid and flexible polyurethane foams. Flexible polyurethane foams are distinct from rigid foams and have a limited resistance to an applied load, are open-celled and permeable to air and are reversibly deformable. See G. Hauptman, H.-A. Freitog and A. Volland, *Polyurethane Handbook*, Chapter 5, Sections 5.0 and 5.3–5.3.3 (Ed. G. Oertal 1985), hereby incorporated by reference.

Flexible foams are generally produced via a continuous slabstock process or a discontinuous molding process. Molding processes are advantageous because articles may be produced fairly easily and without waste. Flexible polyurethane molded foams are particularly suitable for use in seating applications in the home, office and automobile markets.

However, the production of flexible polyurethane molded foams having optimum performance properties can be challenging, particularly where the mold is relatively large and possessed of a complicated shape or configuration. In particular, if the viscosity of the foaming mixture increases to a certain point before the mixture reaches all portions of the mold, the mold will never be fully filled. Generally, the foam formulation will have greatly decreased mobility at it's string gel time or gelation stage. Foam formulations which gel before the mold is adequately filled are said to have inadequate flow.

When the foam formulation has inadequate flow, the resultant molded foams are of suspect quality. They are often prone to instability and collapse and exhibit impaired performance characteristics. Inadequate flowability characteristics can also be manifest as voids and other physical imperfections.

Several prior art attempts to address this problem have focused on the isocyanate component. Particular attempts have used combinations of toluene diisocyanate (TDI), and diphenylmethane diisocyanate (MDI) and/or (polymeric-MDI or polyphenylpolymethylene polyisocyanates PMDI). For example, U.S. Pat. No. 3,492,251 disclosed a mixture of polyisocyanates having 50 to 65 percent PMDI and 30 to 50 percent TDI. However, the foams produced were rigid foams lacking the performance characteristics desired in automotive seating.

U.S. Pat. No. 4,256,849 disclosed a process for the production of cold setting, flexible foams containing urethane groups wherein the isocyanate component was a mixture of diphenylmethane diisocyanates and polyphenylpolymethylene polyisocyanates, both substantially free of carbodiimide groups, the mixture having an isocyanate content of greater than 30 percent. The mixture contained from 60 to 90 percent by weight of 4,4'-diphenylmethane diisocyanate, 3 to 30 percent by weight of 2,4'-diphenylmethane diisocyanate, and up to 20 percent by weight of other polyisocyanates including toluene diisocyanate isomers.

In U.S. Pat. No. 4,803,229 a molded flexible polyurethane foam was prepared by reacting a polyol with a urea-biuret modified polyisocyanate mixture composed of toluene diisocyanate and polymeric diphenylmethane diisocyanate. The disclosure required that either or both of the TDI and PMDI be modified with ureabiuret structures. The patent was directed toward obtaining molded flexible polyurethane foams with improved air flow and compression set.

Finally, U.S. Pat. No. 5,132,334 disclosed a polyisocyanate mixture having 21 to 95 percent by weight of toluene diisocyanate and 5 to 79 percent by weight of a mixture of diphenylmethane diisocyanates and polyphenylpolymethylene polyisocyanates containing (1) 55 to 87 percent by weight of 4,4'-diphenylmethane diisocyanate, (2) 8 to 30 percent by weight of 2,2'-diphenylmethane diisocyanate, (3) 0 to 4 percent by weight of 2,2'-diphenylmethane diisocyanate, and (4) 5 to 35 percent by weight of polyphenylpolymethylene polyisocyanates.

However, the prior art has failed to provide an adequate solution to the above problem. Thus, it is an object of this invention to provide an isocyanate component which has flowability characteristics such that large molds having complicated configurations may be adequately filled to produce flexible polyurethane molded foams having an optimum balance of performance properties.

More particularly, it is an object of the instant invention to provide an isocyanate prepolymer composition, capable of functioning as the isocyanate component in a flexible polyurethane foam formulation which exhibits improved flowability characteristics.

It is a further object of the invention to provide an isocyanate prepolymer composition which satisfies the latter object while simultaneously providing flexible polyurethane molded foams having improved ILD, compression set and flammability characteristics.

SUMMARY OF THE INVENTION

These objects and more are satisfied with the isocyanate prepolymer composition of the invention. The isocyanate prepolymer composition provides improved flowability such that relatively large molds, having complicated shapes and configurations, can be adequately filled to produce flexible polyurethane molded foams having an optimum balance of performance properties.

The isocyanate prepolymer composition of the invention is obtained by combining:

about 50 to 90% by weight of an isocyanate blend (a.) having 55 to 75 percent by weight of 4,4'-diphenylmethane diisocyanate, 17 to 27 percent by weight of 2,4'-diphenylmethane diisocyanate, 1 to 10 percent by weight of 3-ring oligomers of polymethylene polyphenyl polyisocyanate and 1 to 15 percent by weight of n-ring oligomers of polymethylene polyphenyl polyisocyanate (n being greater than 3); about 5 to 30 percent by weight of a polyhydroxy containing polyol (b.) having a molecular weight of from 2000 to about 4000; and about 5 to 15 percent by weight of a toluene diisocyanate (c.).

The resulting isocyanate prepolymer composition has a free NCO content of from about 25 to 35 percent by weight and is characterized as having from 45 to 50 percent by weight 4,4'-diphenylmethane diisocyanate, 15 to 20 percent by weight 2,4'-diphenylmethane diisocyanate, 12 to 18 percent by weight of a prepolymer which is the reaction product of PMDI and the polyhydroxy containing polyol, 1 to 5 percent by weight 3-ring MDI oligomer, 3 to 7 percent by weight n-ring MDI oligomers (n being greater than 3), 0.5 to 4 percent by weight of 2,6-toluene diisocyanate, and 5 to 10 percent by weight 2,4-toluene diisocyanate.

The invention also provides a method of preparing the isocyanate prepolymer composition, a method of making a polyurethane foam utilizing the composition of the invention, as well as polyurethane foams produced by said process. The claimed foams exhibit an optimum balance of performance properties. In particular, the claimed foams exhibit desirable ILD, compression set, and flammability characteristics.

The isocyanate prepolymer composition of the invention is believed to have the advantages of MDI-based systems and the flowability characteristics typically exhibited by TDI-based isocyanate blends. Use of the composition will ideally provide the ability to obtain a wider hardness range at a particular index as compared with TDI-based systems, as well as the ability to obtain a greater percentage of open cells as compared to those typically obtained with TDI based systems. The composition provides the better processing latitude typically exhibited with MDI-based systems and allows the use of lower mold temperatures.

Finally, the isocyanate prepolymer composition provides the advantages of decreased surface defects and decreased potential for shrinkage upon removal from the mold.

DETAILED DESCRIPTION OF THE PREFERRED EMBODIMENT

The isocyanate prepolymer composition of the invention is obtained by combining an isocyanate blend (a.), a polyhydroxy-containing polyol (b.) and a toluene diisocyanate (c.).

Suitable isocyanate blends (a.) are comprised of diphenylmethane diisocyanate (MDI) and polymeric polyphenyl polymethylene polyisocyanate (polymeric-MDI or PMDI). The MDI or PMDI may be in crude form or in a form modified by removal of some diisocyanates through distillation or crystallization.

The MDI component of the isocyanate blend (a.) may be provided by any diphenylmethane diisocyanate commonly available. Suitable MDI's may be pure 4,4'-MDI or mixtures of 4,4'-MDI and 2,4'-MDI isomers. Such mixtures of MDI isomers will preferably contain less than 10 percent by weight of 2,2'-MDI isomers.

The PMDI component of isocyanate blend (a.) will generally be a mixture of diphenylmethane diisocyanate isomers, triisocyanates, and higher functional oligomers. The latter triisocyanates and higher functional oligomers may also respectively be described as 3-ring MDI oligomers and n-ring MDI oligomers, wherein n is greater than 3. Suitable PMDI isocyanates will generally contain a certain percentage of diphenylmethane diisocyanate isomers with the remainder being the desired 3-ring and higher functional oligomers. Particularly suitable commercially available PMDI isocyanates will contain from 40 to 50 percent MDI isomers and from 15 to 25 percent 3-ring oligomers and from 20 to 45 percent by weight of n-ring and higher MDI oligomers.

The MDI and PMDI components of the isocyanate blend (a.) will be combined in a manner such that the isocyanate blend (a.) comprises: (i) 55 to 75 percent by weight of 4,4'-diphenylmethane diisocyanate isomer, (ii) 17 to 27 percent by weight of 2,4'-diphenylmethane diisocyanate isomer, (iii) 1 to 10 percent by weight of 3-ring MDI oligomers, and (iv) 1 to 15 percent by weight of n-ring MDI oligomers (n being greater than 3), based on the weight of isocyanate blend (a.).

More particularly, the MDI and PMDI components will be combined so that the combination of the two components results in an isocyanate blend (a.) having from 60 to 70 percent by weight of 4,4'-MDI, 20 to 24 percent by weight of 2,4'-MDI, (iii) 3 to 7 percent by weight of 3-ring MDI oligomers, and (iv) 3 to 11 percent by weight of n-ring MDI oligomers (n being greater than 3).

Most preferably, isocyanate blend (a.) will have from 62 to 67 percent by weight of 4,4'-MDI, (ii) 21 to 23 percent by weight of 2,4'-MDI, (iii) 4 to 6 percent by weight of 3-ring MDI oligomers, and (iv) 4.5 to 10 percent by weight of n-ring MDI oligomers (n being greater than 3).

Isocyanate blend (a.) may further contain modified diisocyanates containing allophanate, uretonimine-carbodiimide, or isocyanurate linkages. Uretonimine-carbodimide derivatives of essentially pure diphenylmethane diisocyanate can be made by well-known techniques, such as the conversion of a portion of the isocyanate groups in diphenylmethane diisocyanate to a carbodiimide by using a phosphorus-containing catalyst at elevated temperatures, and then allowing the carbodiimide modified diphenylmethane diisocyanates to further react with unreacted isocyanates groups to form uretonimine modified MDI. The conversion from carbodiimide modified MDI to uretonimine modified MDI does not typically go to completion, having a composition containing small amounts of carbodiimide groups. Typically from about 10 to 35 percent by weight of the MDI as converted to uretonimine-carbodiimide modified MDI species leaving from 65 to 90 percent of the MDI unreacted. Isocyanate blend (a.) can optionally contain from about 2 to 50 percent by weight of such modified MDI.

The isocyanate blend (a.) is reacted with the polyhydroxy-containing polyol (b.). The polyhydroxy-containing polyol (b.) will most generally be a polyoxyalkylene polyol. The polyoxyalkylene polyol employed is preferably a polyoxyalkylene polyether polyol, although polyester groups contained therein are also contemplated as within the invention.

Methods of preparing polyoxyalkylene polyether polyols are well known, for example, by the base catalyzed addition of an alkylene oxide to an initiator molecule containing an average two or more active hydrogens, such as a polyhydric alcohol. Examples of alkylene oxide include ethylene oxide, propylene oxide, butylene oxide, amylene oxide, mixtures thereof, tetrahydrofuran, alkylene oxide-tetrahydrofuran mixtures, epihalohydrins, and aralkylene oxides such as styrene oxide. Suitable initiators include both aliphatics and aromatics, such as ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The polyoxyalkylene polyether polyols may have either primary or secondary hydroxyl groups. Included among the polyether polyols are polyoxyethylene glycol, polyoxypropylene glycol, polyoxypropylene glycerine, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859, *Encyclopedia of Chemical Technology*, Vol. 7, pp. 257–262, published by Interscience Publishers, Inc. (1951) or in U.S. Pat. No. 1,922,459.

Polyethers which are preferred include the alkylene oxide addition products of trimethyolpropane, glycerine, propylene glycol, dipropylene glycol, and 2,2'-(4,4'-hydroxyphenyl)propane and mixtures of diols and triols such as propylene glycol-glycerine blends. The most preferred diols and triols are propylene glycol, glycerine, and mixtures thereof.

Alkylene oxides which are preferred are ethylene oxide and propylene oxide or mixtures thereof reacting with the initiator molecule to make polyoxyalkylene polyether polyols having predominately polyoxypropylene groups with from 0 to 30 percent by weight polyoxyethylene groups as an end cap, a block, or heteric, preferably as a cap.

The polyether polyols of the invention have a number average molecular weight ranging from 500 to 10,000, preferably from 2000 to 6,000, with average functionalities from 1.5 to about 4.0, preferably from 1.8 to 3.0. Hydroxyl numbers will generally range from about 11 to 225. The most preferred polyols will have a number average molecular weight of from 2000 to 4000.

Particularly suitable polyols are the propylene oxide adducts of propylene glycol, glycerine and/or mixtures thereof, with characteristics as described above. Most preferably, however, such polyols will have a number average molecular weight of 2000 to 4000, a functionality of 1.8 to 3.0 and a hydroxyl number of 25 to 85.

Finally, the third component used to make the isocyanate prepolymer composition of the invention is a toluene diisocyanate (c.). Any suitable toluene diisocyanate may be used, including for example, 2,4-toluene diisocyanate, 2,6-toluene diisocyanate and the like. Particularly suitable mixtures are those containing from about 65 to about 80 percent 2,4-toluene diisocyanate and the balance 2,6-toluene diisocyanate. Commercially available mixtures containing about 80 percent of 2,4- and about 20 percent of 2,6-toluene diisocyanate are most preferred.

In order to make the isocyanate prepolymer composition of the invention, approximately 50 to 90 percent by weight of isocyanate blend (a.) is combined with about 5 to 30 percent by weight of polyhydroxy containing polyol (b.) and about 5 to 15 percent by weight of toluene diisocyanate (c.). More particularly, about 70 to 85 percent of isocyanate blend (a.) will be combined with 8 to 20 percent polyol (b.) and 7 to 13 percent toluene diisocyanate (c.). Most preferably, 75 to 80 percent of (a.) will be combined with 10 to 13 percent (b.) and 8–10 percent (c.).

As used herein, the term 'combined' is intended to encompass two distinct reaction schemes. The isocyanate prepolymer composition may be obtained by reacting isocyanate blend (a.) with polyol (b.) to form a prepolymer (I). Prepolymer (I) is subsequently blended with the toluene diisocyanate (c.) to form the isocyanate prepolymer composition.

Alternatively, the isocyanate prepolymer composition of the invention can be obtained by adding isocyanate blend (a.) to toluene diisocyanate (c.) to form a mixture (I). Mixture (I) is subsequently reacted with the polyol (b.) to form the isocyanate prepolymer composition of the invention.

In either case, it is contemplated that the reaction with the polyol (b.) will take place at temperatures of between 25° C. and 100° C. More preferably, the reaction with polyol (b.) will take place at temperatures between 50° to 80° C.

The reaction with polyol (b.) will preferably take place for a time sufficient for the final isocyanate prepolymer composition to have a free NCO content of about 25 to 40 percent by weight. In general, the reaction of polyol (b.) with either mixture (I) or prepolymer (I) will take a total of 10 hours and preferably less than a total of 7 hours. Most preferred is a reaction time of 5 hours or less. If prepolymer (I) is formed, it should have an NCO content of 20 to 40 and most preferably from 25 to 35.

At the conclusion of the appropriate reaction scheme, the isocyanate prepolymer composition of the invention should have a free NCO content of from about 20 to 40 percent by weight. More preferably, the claimed prepolymer composition will have a free NCO content of 25 to 35 percent and most preferably from 28 to 32 percent by weight.

The isocyanate prepolymer composition of the invention may be further characterized in terms of the various percentages of molecular species contained therein. It has been found that particularly desirable flow and performance characteristics are obtained by the isocyanate prepolymer composition having from 1 to 5 percent 3-ring MDI oligomers, 3 to 8 percent n-ring MDI oligomers, (n being greater than 3), 40 to 60 percent 4,4'-MDI isomers, 10 to 25 percent 2,4'-MDI isomers, 4 to 13 percent 2,4'-TDI isomers, 0.1 to 5 percent 2,6-TDI isomers and from 10 to 20 percent of a PMDI-glycerine triol prepolymer.

More preferably, the isocyanate prepolymer composition will have from 2.5 to 3.5 percent 3-ring MDI oligomers, 5.5 to 6.5 percent n-ring MDI oligomers, (n being greater than 3), 45 to 50 percent 4,4'-MDI isomers, 15 to 20 percent 2,4'-MDI isomers, 6.5 to 9.5 percent 2,4'-TDI isomers, 0.5 to 2.5 percent 2,6'-TDI isomers and from 13 to 17 percent of a PMDI-glycerine triol prepolymer.

In addition, the isocyanate prepolymer composition may be characterized by its highly desirable flowability characteristics. For example, as can be seen in the working examples below, it has been found that the prepolymer composition of the invention should have flowability characteristics such that, as measured by a free-rise, hand-mixed foam, the difference between the TOC time and the string-gel time is equal to at least 45 percent of the TOC time. Those skilled in the art will appreciate that such comparative measurements should be done under conditions approximately equivalent to those set forth in Example 2 below. The term 'TOC' is intended to indicate the time necessary for a free-rise, hand-mixed foam to reach the top of a cup in which the foaming mixture has been placed. The string-gel time is defined as the time when the foaming mass strings when the surface is touched and pulled. This is believed to be an indication that the polymerizing mixture has reached the maximum achievable molecular weight and that there will be little, if any, additional flow of the foaming mass.

It will be appreciated that maximizing the time between the TOC and the string-gel time results in an isocyanate composition which, when combined with a resin side component, will possess a flow such that the foaming mass will be able to reach all portions of a large mold having a complicated configuration. Thus, the mold will be fully filled prior to the onset of gelation and the rapid increase in the foam viscosity.

The isocyanate prepolymer composition of the instant invention may be utilized to produce foams having highly desirable performance characteristics. The prepolymer composition is added to a resin side component comprised of a blend of a polyol, a urethane promoting catalyst, a blowing agent and optionally a surfactant, chain extender, flame-inhibitor, antioxidants, and mixtures thereof.

Compounds having at least two isocyanate reactive hydrogens which may be employed in the preparation of polyurethane foams and elastomers are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols such as the aforementioned polyoxyalkylene polyether polyols, polyhydroxy-terminated polyurethane polymers, polyhydroxyl-containing phosphorous compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used, for example, amino alcohols which contain an amino groups and a hydroxyl group. Also, alkylene oxide adducts of compounds which contain one SH group and one OH group as well as those which contain an amino groups and an SH group may be used. Generally, the number average molecular weight of the polyols will vary from greater than 400 to 10,000, and preferably from 2500 to 7,000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethylglutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohols" are compounds derived from phenol such as 2,2-bis(4-hydroxylphenyl)propane, commonly known as Bisphenol A. Preferred are diols and triols for the manufacture of flexible polyurethane foams.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as those disclosed above for preparing the prepolymers. Polyethers which are preferred include the alkylene oxide addition products of trimethylolpropane, glycerine, propylene glycol, dipropylene glycol, and 2,2'-(4,4'-hydroxyphenyl)propane and blends thereof having equivalent weights of from 100 to 5,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorous compounds which may be used include those compounds disclosed in U.S. Pat. No. 3,639,542. Preferred polyhydroxyl-containing phosphorous compounds are prepared from alkylene oxides and acids of phosphorous having an acid equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3-, 2,6-, 3,4-, 2,5-, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Polyols containing graft polymer dispersions may also be employed in the invention. These are prepared by the in situ polymerization, in the polyols listed below, of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substitute styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2 methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinylpyrrolidone, vinyl imidazole, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimehtylaminoethyl methacrylate, glycidyl acrylate, allyl alcohol, glycol monoesters of itaconic acid, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 70 percent, preferably from 30 percent to 45 percent, based on the total weight of the product. The polymerization occurs at a temperature between about 25° C. and 180° C., preferably from 80° C. to 135° C.

The unsaturated polyols or macromers which may be employed in preparing the graft polymer dispersion may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryloyl chloride, hydroxy ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, pentaerythritol vinyl ether, pentaerythritol diallyl ether, and 1-butene-3,4-diol, unsaturated epoxides such as 1-vinyl-cyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azobis-(2-methyl heptonitrile), 1,1'-azobis(cyclohexane carbonitrile), 4,4'-azobis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4-methoxy-4-methylpentane, 2,2'-azobis-2-methylbutanenitrile, 2 -t-butylazo-2-cyanobutane, 1-t-amylazo-1-cyanocyclohexane, 2,2'-azobis(2,4-dimethyl- 4-methoxyvaleronitrile, 2,2'-azobis-2-methylbutyronitrile, 2-t-butylazo-2-cyano-4-methylpentane, 2-t-butylazo-2-isocutyronitrile, to butylperoxyisopropyl carbonate and the like; a mixture of initiators may also be used. The preferred initiators are 2,2'-azobis(2-methylbutyronitrile), 2,2'-azobis(isobutyronitrile), 2,2'-azobis(2,4-dimethylvaleronitrile), 2-t-butylazo-2-cyano-4-methoxy-4-methylpentane, 2-t-butylazo-2-cyano- 4-methylpentane, 2-t-butylazo-2-cyano-butane and lauroyl peroxide. Generally, from about 0.1 percent to about 10 percent, preferably from about 1 percent to about 4 percent, by weight of initiator based on the weight of the monomer will be employed in the process of the invention.

The polyurethane foams achieved by the present invention are generally prepared by the reaction of a polyether polyol or a graft polymer dispersion in a polyol as disclosed above, with the isocyanate prepolymer composition, in the presence of a blowing agent and catalyst. Optionally, the reaction may take place in the presence of additional polyhydroxyl-containing components, chain-extending agents, surface-active agents, stabilizers, dyes, fillers, pigments and mixtures thereof. Suitable processes for the preparation of cellular polyurethane products are disclosed in U.S. Pat. No. Re. 24,514, herein incorporated by reference, together with suitable machinery to be used in conjunction therewith.

Another feature of the process according to this invention is the use of water, which reacts with the isocyanate mixture and provides carbon dioxide, as blowing agent. Preferably used are 1 to 8 percent by weight, in particular 2.5 to 5 percent by weight, of water based on the weight of the polyol. Instead of water alone, optionally, mixtures of water and chemically inert, low-boiling, halogenated hydrocarbons can also be used as foaming agents. These include, for instance, halogenated hydrocarbons having boiling points below 50° C., preferably between −50° C. and 30° C. at atmospheric pressure. The following listing is used as an example: halogenated hydrocarbons such as monochlorodifluoromethane, dichloromonofluoromethane, dichlorofluoromethane, and trichlorofluoromethane and their mixtures, and hydrocarbons such as propane, n-butane, and isobutane as well as dimethyl ether and cyclopentane. Suitable mixtures of water and halogenated hydrocarbons generally consist of 5 to 70 percent by weight, preferably 10 to 50 percent by weight, of water and 30 to 95 percent by weight, preferably 50 to 90 percent by weight, of halogenated hydrocarbons, with the percent by weight being based on the total weight of the blowing agent mixture.

The required quantities of blowing agent mixture can be determined experimentally in a very simple manner as a function of the mixing ratio of water to halogenated blowing agents as well as the desired density of the foam and amount to approximately 2 to 40, preferably 5 to 25 percent by weight based on the weight of the polyol.

It may be appropriate to use chain-extending agents. Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. Such agents will generally have a number average molecular weight of less than about 400. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams generally collapse or contain very large uneven cells. Numerous surface-active agents have been found satisfactory. Nonionic surface-active agents are preferred. Of these, the nonionic surface-active agents such as the well-known silicones have been found particularly desirable. Other surface-active agents which are operative, although not preferred, include paraffin oils, castor oil, turkey red oil, polyethylene glycol ethers of long chain alcohols, tertiary amine or alkanolamine salts of long chain alkyl acid sulfate esters, alkyl sulfonic esters, and alkyl arylsulfonic acids.

Among the flame retardants which may be employed are pentabromodiphenyl oxide, dibromopropanol, tris(β-chloropropyl)phosphate, 2,2-bis(bromoethyl) 1,3-propanediol, tetrakis(2-chloroethyl)ethylene diphosphate, tris(2,3-dibromopropyl)phosphate, tris(β-chloroethyl)phosphate, tris(1,2-dichloropropyl)phosphate, bis-(2-chloroethyl) 2chloroethylphosphonate, molybdenum trioxide, ammonium molybdate, ammonium phosphate, pentabromodiphenyloxide, tricresyl phosphate, hexabromocyclododecane, melamine, and dibromoethyldibromocyclohexane. The concentrations of flame retardant compounds which may be employed range from 5 to 25 parts per 100 parts of polyol mixture.

The isocyanate prepolymer side and the resin side may be mixed at temperatures from 15° C. to 90° C., preferably at tank temperatures from 20° C. to 35° C., and may be poured or sprayed into an open mold which is subsequently optionally closed, or may be injected at high pressures into a closed mold. The mixing can be performed mechanically by means of a stirrer or under high pressure by the impingement method. The mold temperature should be from about 20° C. to 60° C., preferably 30° C. to 60° C. The resultant cellular polyurethane moldings may have applications in the automotive industry as head rests, spoilers, bumpers; for interior applications, such as shoe soles; and for seating applications.

The following working examples describe the manner and process of making and using the invention and set forth the best mode contemplated by the inventors of carrying out the invention, but are not to be construed as limiting.

The following ingredients were employed to make the prepolymer according to the isocyanate prepolymer composition of the invention and the foams prepared therewith;

Polyol A is a propylene oxide adduct of a glycerine-propylene glycol blend having an OH number of 57.6.

Polyol B is a propylene oxide-ethylene oxide adduct of trimethylolpropane having an OH number of 25 and a 15 weight percent ethylene oxide cap.

Polyol C is a propylene oxide-ethylene oxide adduct of trimethylolpropane having an 13 weight percent ethylene oxide cap as carrier and a graft polyol having 31 weight percent 1:1 acrylonitrile styrene and an OH number of 24.

Polyol D is an ethylene oxide-propylene oxide heteric adduct of glycerine having 25 weight percent ethylene oxide and an OH number of 46.

Isocyanate A is a polymeric-MDI having about 44 weight percent 4,4'-MDI and 2 weight percent 2,4'-MDI for a total of 46 weight percent 2-ring content, and an NCO content of 31.6 weight percent.

Isocyanate B is a pure MDI composition containing about 50 weight percent 2,4'-MDI, the remainder essentially 4,4'-MDI.

Isocyanate C is an essentially pure 4,4'-MDI having a functionality of 2.0 and an NCO content of 33.5 weight percent.

DABCO 33 LV is a dipropylene glycol solution containing 33 percent triethylenediamine (TEDA) available from Air Products Corporation and used as a polyurethane catalyst.

NIAX A-1 is a catalyst sold by Union Carbide Corporation.

DABCO X-8154 is an amine catalyst sold by Air Products Corporation.

Tegostab® B-4690 is a silicone surfactant available from Gold Schmidt, Essen.

Tegostab® B-4113 is a silicone surfactant sold by Gold Schmidt, Essen.

All parts are by weight unless otherwise stated.

EXAMPLE 1

An isocyanate prepolymer composition according to the invention was prepared in the following manner. 79 parts of a isocyanate blend (a.) having a NCO content of 33.04 weight percent, were placed into a clean, dry and nitrogen purged reactor. The isocyanate blend (a.) was comprised of approximately 18.3 parts isocyanate A, 33.33 parts isocyanate B, and 27.33 parts isocyanate C. Agitation of the reactor contents was commenced and the reactor was heated to 50° C. 12 parts of polyol A was added at a constant rate over a period of 1 hour. The temperature was maintained at 50° C. or above. After the addition was completed, the contents were reacted at 50° C. for four hours. The free NCO content of resultant prepolymer (I) was 28.0 percent by weight. 9 parts of 80/20 TDI was added to prepolymer (I) and mixed until homogeneous. The free NCO content of the resultant isocyanate prepolymer composition was 29.8 weight percent. The isocyanate prepolymer composition had a viscosity of 49 cps at 25° C. The final calculated composition of the isocyanate prepolymer composition was:

| | |
|---|---|
| 3-ring MDI oligomer = | 3.3 percent by weight; |
| n-ring MDI oligomers = (n being greater than 3) | 6.16% by wt. |
| 4,4'-MDI = | 48.28% by wt. |
| 2,4'-MDI = | 17.75% by wt. |
| 2,4'-TDI = | 7.20% by wt. |
| 2,6-TDI = | 1.8% by wt. |
| PMDI-glycerine triol prepolymer = | 15.51% by wt. |

EXAMPLE 2

The flowability characteristics of the isocyanate prepolymer composition of the invention were evaluated in the following manner.

A resin side component was prepared according to the following formulation:

| | |
|---|---|
| Polyol B | 67.92 |
| Polyol C | 24.67 |
| Polyol D | 1.00 |
| DEOA, 99 Percent | 1.00 |
| Water | 2.98 |
| DABCO 33 LV | 0.04 |
| NIAX A1 | 0.10 |
| DABCO X8154 | 0.71 |
| B-4690 | 0.20 |
| B-4113 | 1.38 |
| TOTAL | 100 Percent |

A prior art isocyanate D was prepared in the following manner. A blend was prepared by mixing 34.5 parts of isocyanate A, 28.9 parts of isocyanate B and 28.9 parts of isocyanate C. This blend was heated to 50° C. and 7.7 parts of A was added at a constant rate over a period of 30 minutes. Maintaining the temperature above 50° C., the contents were reacted for 4 hours while the temperature was maintained at a temperature above 50° C. The NCO content of the resultant product was 29.8 percent and the viscosity 54 cps at 25° C.

100 parts of the above resin side formulation was individually added to 58.1 parts of the prepolymer composition of Example 1 and 58.1 parts of isocyanate D, (a 102 index). The flowability characteristics were evaluated using hand-mixed free rise reactivities in No. 5, No. 10 and quart Lily cups.

| Isocyanate | Cup Size | Cream Time | Top of Cup | String Gel | End of Rise | Free Rise Density |
|---|---|---|---|---|---|---|
| Iso of Ex 1 | 10 | 17 | 80 | — | 90 | — |
| Iso D | 10 | 17 | — | — | 85 | — |
| Iso of Ex 1 | 5 | 16 | 49 | 72 | 90 | 2.72 |
| Iso D | 5 | 17 | 51 | 63 | 76 | 3.06 |
| Iso of Ex 1 | qt. | 15 | 43 | 70 | 93 | 3.26 |
| Iso D | qt. | 17 | 47 | 66 | 79 | 3.41 |

(Times in seconds, density in pcf.)

Data from the #10 Lily does not show anything because the amount of foam made was too small. Using the other two cups, a difference can be seen by comparing the relative time difference between the gel time and the top of cup (TOC) time. The greater difference with the isocyanate prepolymer composition of the invention is an indication that the foam has a chance to flow farther before the onset of gel. One can also conclude that the lower free rise density indicates that flowability of the foam formulation would be enhanced with the use of the isocyanate prepolymer composition of the invention.

The foam crown observed with the isocyanate component of Example 1 had a profile which was significantly more curved than the profile of the crown observed with Isocyanate D. The appearance of such a foam crown is evidence of better flowability. These results indicate that the foam spread out more with the isocyanate of Example 1 than with Isocyanate D.

EXAMPLE 3

The performance properties of a polyurethane foam obtained with the isocyanate prepolymer composition of the invention were obtained in the following manner.

A resin side component having a formulation identical to that set forth in Example 2 was combined with the isocyanate prepolymer composition of the Example 1 using a mix ratio of 100 parts resin side component to 57 parts isocyanate component. The component temperatures were 25° C. The components were metered and mixed and the foaming liquid manually dispensed into a mold maintained between 50° C.–60° C. The mold was closed and the foaming mass allowed to fill the cavity. After five minutes the mold was opened, and the foam pad removed and passed through a roller crusher. The resultant flexible polyurethane molded foam had performance properties as set forth below:

| PROPERTY | METHOD | UNITS | RESULT |
|---|---|---|---|
| PACKED DENSITY | DIN 53 420 | Kg/m$^3$ | 45–50 |
| ILD, IDF, OR EHZ | FBMS 7-7/11 P-VW-3410 | Nw | 150–400 |
| TENSION RESISTANCE | DIN 2406 FBMS 7-7/11/11B | Kpa | 100–130 |
| ELONGATION | DIN 2406 FBMS 7-7/11C | % | 110–130 |
| TEAR RESISTANCE | DIN 53 356 | Nw/m | 1.9–3.0 |
| COMPRESSION SET 50% | DIN 53420 | % | 7–10 |
| FLAMMABILITY | ASTM-3212 | mm/min | 45–52 SELF EXTINGUISHING |

We claim:

1. A process of making an isocyanate prepolymer composition, said composition being capable of reacting with a compound having at least two isocyanate reactive hydrogens to produce a polyurethane foam, the process comprising combining:

a. about 50 to 90% by wt of an isocyanate blend comprising:
(i) 55 to 75% by wt of 4,4'-diphenylmethane diisocyanate;
(ii) 17 to 27% by wt of 2,4'-diphenylmethane diisocyanate;
(iii) 1 to 10% by wt of 3-ring oligomers of polymethylene polyphenyl polyisocyanate; and
(iv) 1 to 15% by wt of n-ring oligomers of polymethylene polyphenyl polyisocyanate, where n is greater than 3;

b. about 5 to 30% by wt of a polyhydroxy containing polyol having a molecular weight of from 1000 to about 10,000; and c. about 5 to 15% by wt of toluene diisocyanate:
wherein the resulting isocyanate prepolymer composition has a free NCO content of from about 20 to 40% by wt.

2. The process of claim 1 further comprising:
reacting isocyanate blend (a.) with the polyol (b.) to form a prepolymer (I); and
adding toluene diisocyanate (c.) to the prepolymer (I) to form the isocyanate prepolymer composition.

3. The process of claim 1 further comprising:
adding isocyanate blend (a.) to the toluene diisocyanate (c.) to form a mixture (I); and
reacting mixture (I) with the polyol (b.) to form the isocyanate prepolymer composition.

4. The process of claim 2 further comprising reacting isocyanate blend (a.) with polyol (b.) at a temperature between 50° C. and 100° C.

5. The process of claim 3 further comprising reacting mixture (I) with polyol (b.) at a temperature between 25° C. and 100° C.

6. The process of claim 1 wherein the reactants (a.), (b.) and (c.) are combined to produce an isocyanate prepolymer composition having a free NCO content of about 28 to 32% by wt.

7. The process of claim 1 further comprising combining a polyol (b.) which is an oxypropylated glycerin-propylene glycol having a molecular weight of about 2000 to 4000.

8. The process of claim 7 further comprising combining a polyol (b.) which has a functionality of 1.5 to 4.0, and a hydroxyl number of 11 to 225.

* * * * *